Oct. 14, 1958     G. E. GUSTAFSON ET AL     2,856,466
HEARING AIDS
Filed Jan. 26, 1956     2 Sheets-Sheet 1

INVENTORS:
GILBERT E. GUSTAFSON
& JOHN T. VALASKOVIC,

BY John J. Pederson
ATTORNEY

Oct. 14, 1958  G. E. GUSTAFSON ET AL  2,856,466
HEARING AIDS

Filed Jan. 26, 1956  2 Sheets-Sheet 2

INVENTORS:
GILBERT E. GUSTAFSON
& JOHN T. VALASKOVIC,
BY John J. Pederson
ATTORNEY

United States Patent Office 2,856,466
Patented Oct. 14, 1958

2,856,466

HEARING AIDS

Gilbert E. Gustafson, River Forest, and John T. Valaskovic, Chicago, Ill., assignors to Zenith Radio Corporation, a corporation of Delaware Application January 26, 1956, Serial No. 561,416

3 Claims. (Cl. 179—107)

This invention relates to hearing aids, and more particularly to hearing aid devices mounted on spectacle frames.

It has often been proposed to construct a hearing aid of portions adapted for mounting on the several members of a spectacle frame. Known constructions of one kind include hearing aid structures composed of two or more distinct sub-assemblies, which sub-assemblies are rigidly and permanently attached to the lateral bows of the spectacle frame. The sub-assemblies are not easily removed from the spectacle bows, nor are they generally interchangeable from one bow to the other. Known forms of such hearing aid assemblies have been bulky and conspicuous.

It has also been proposed to embed the various components of an electronic hearing aid physically in the plastic material constituting the temple bows or other portions of a spectacle frame. Such units require complete replacement when any part becomes defective, and servicing is thus a considerable problem. Not only is the repair problem itself made difficult, but the user is deprived of the use of the spectacles whenever the hearing aid requires repair.

Since different persons may require hearing assistance in one ear or the other, and since the usual forms of temple bows are not interchangeable as between right and left, it has usually been necessary to provide special arrangements for satisfying these requirements; this increases manufacturing cost and requires an extensive inventory of sub-assemblies in the hands of dealers. The necessity for temple bows of different lengths to suit different wearers constitutes a further objection to the truly integral forms of construction.

It is accordingly a principal object of the present invention to provide a hearing aid constituted by cooperating sub-assemblies respectively carried by the opposite temple bows of a spectacle frame in an interchangeable manner, such that the reproducer may be applied to either ear as desired for a particular complete assembly, without requiring any change other than the insertion and removal of conventional fasteners such as screws or the like.

A further object of the invention is to provide such an arrangement in which the hearing aid components may readily be assembled by the dealer to temple bows of different lengths, so that this requirement can be satisfied with a minimum inventory.

Another object of the the invention is to provide an arrangement of the above kind in which the electronic components of the device are readily accessible for repair or servicing, yet in which the parts added to the spectacle frame are inconspicuous and pleasing to the eye.

It is a further object of the invention to provide such a hearing aid assembly which may be removed from the spectacle frame itself for service or replacement, without the necessity of depriving the user of his visual assistance when the hearing aid is removed.

In accordance with the invention, an eye glass hearing aid of the type comprising electrical units including a microphone coupled to an amplifier which is energized from a power source and coupled to a reproducer comprises a spectacle frame including a front frame member, and a pair of solid side temple bow members extending from opposite ends of the front frame member and each having inside and outside portions. A plurality of conductors are embedded in and extend from one of the temple bow members, through the front frame member, to the other of the temple bow members. A plurality of first electrical and mechanical connector elements of a first mating type are spaced apart on each of the temple bow members by individual selected distances, and are individually connected to respective end portions of each of the conductors. A pair of chassis members are disposed individually on the outside portions, with the amplifier and power source units mounted thereupon and distributed therebetween; the microphone is disposed on one of the chassis members and the reproducer is coupled to the other chassis member. A plurality of second connector elements are secured to each chassis member and individually mated with respective ones of the first connector elements to establish operative cooperation between the units by way of the conductors.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figure 1:
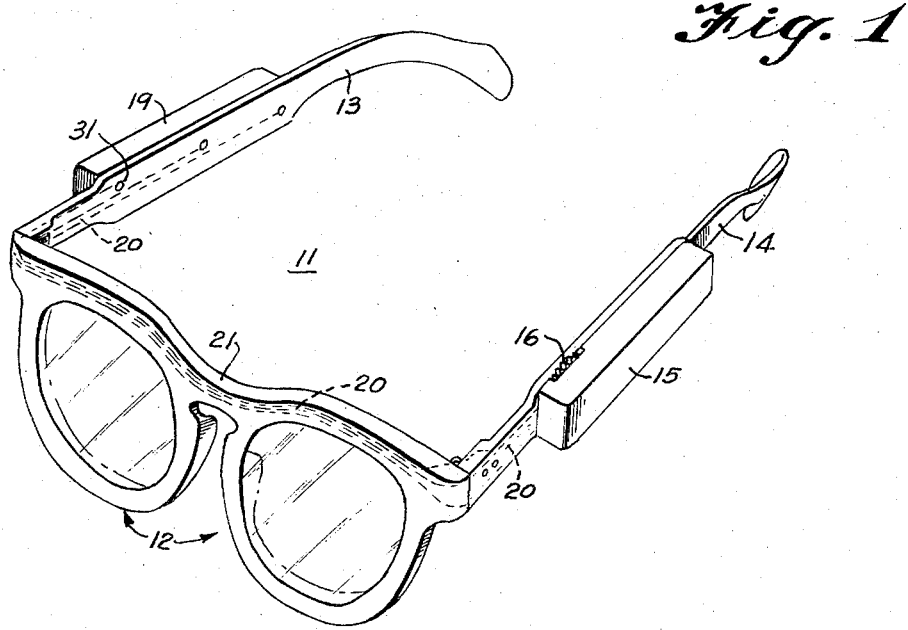
Fig. 1 is a perspective view of a preferred embodiment of the invention.

Fig. 1 shows a spectacle frame 11 which includes a frontal bridge member 12 and a pair of lateral bow members 13 and 14. On bow member 14 a hearing aid amplifier unit 15, to be described more fully hereinafter, is fastened by means also to be described. Amplifier unit 15 includes a knurled volume control knob 16 and is connected to a hearing aid ear piece 17 (see Fig. 2) by a cord 18. A hearing aid microphone unit 19 is similarly disposed on spectacle bow 13. Conductor means including three electrically conductive leads 20 are supported upon, and preferably carried within, the forward portion of bow member 13, the upper portion of frontal bridge member 12, and the forward portion of bow member 14.

Figure 2:
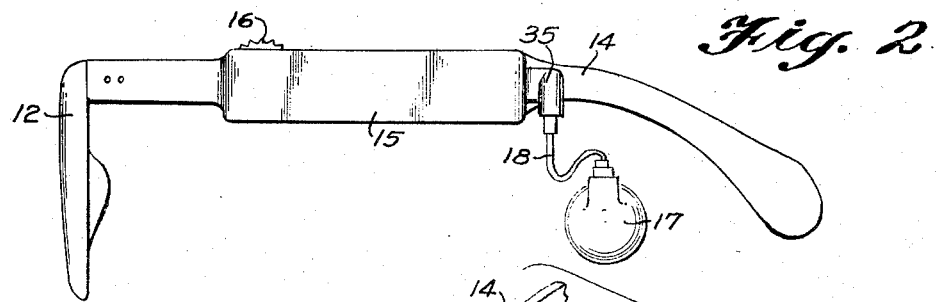
Fig. 2 is a side elevational view thereof.

Fig. 2 of the drawings shows in left side view the assembly of amplifier unit 15 upon temple bow 14, with the reproducer 17 in about the position it would occupy in the wearer's ear when the apparatus is in use. An ordinary ear mold will of course be provided to ensure a tight seal into the ear canal, or alternatively a bone-conduction vibrator may be substituted for this type of reproducer.

Figure 3:
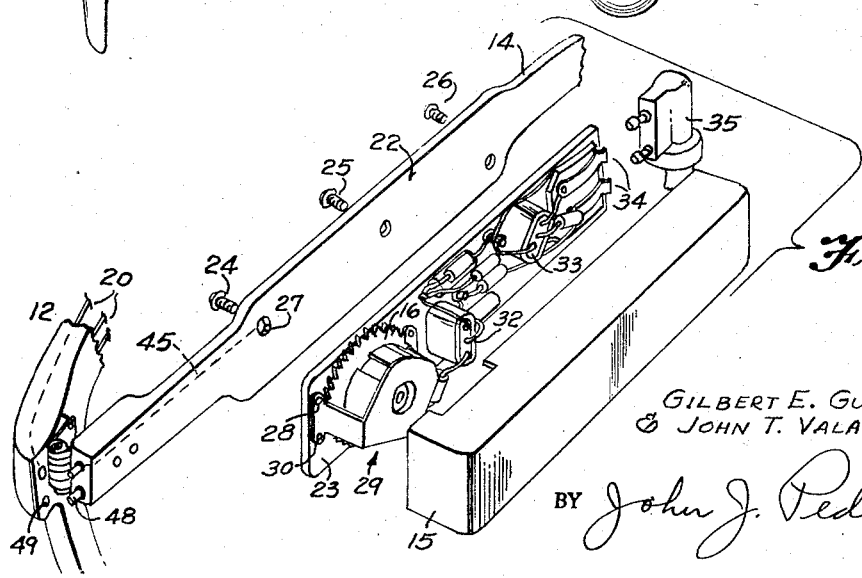
Fig 3 is an exploded fragmentary perspective view illustrating certain details.

The assembly details of amplifier unit 15 are better shown in the exploded view of Fig. 3. Thus, the temple bow 14 is shown as provided with a laterally flattened central section 22, to which is secured the rectangular chassis plate 23 carrying the electrical components of this section, as by small screws 24, 25 and 26 located preferably at the forward, central and rearward portions of the amplifier unit. These screws are at different vertical levels, and are arranged to pass through the flattened portion 22 via holes which contain metallic inserts connected to the respective conductors 20. Thus, in Fig. 3, the top conductor terminates in contact with screw 24 which passes through the uppermost and forwardmost hole containing conductive insert 27, and through chassis plate 23 to a metallic insert 28 in the chassis plate into which it is threaded. Insert 28 may be integral with a metallic portion of the volume control 29.

Before pursuing the detailed description, it should be pointed out that the arrangement of Fig. 2 provides the ear piece reproducer 17 in position for cooperating with the left ear of the user. The electrical components are divided between the two casings 15 and 19, to reduce the bulk of both. Casing 15 contains the output amplifier portion and the connector for the ear piece or reproducer, while casing 19 contains the battery, the microphone and the input portion of the amplifier. To interchange these casings so as to provide amplifier output at the right ear of the user, it will be necessary in effect to rotate casing 15 about its long axis through 180°, so as to leave the ear piece connector of casing 15 at the rear when it is positioned on the opposite temple bow 13. To permit this to be done without changing any connections except those incidental to removal and replacement of the mounting screws, the inserts in the chassis plates are doubled at positions symmetrical about the longitudinal center-line of each casing.

Thus, in Fig. 3, it will be seen that connector insert 28 has its symmetrically placed double represented by tapped insert or metal piece 30. In all cases, the dual connector parts are connected electrically to one another, and in Fig. 3, for example, the uppermost screw 24 connects with insert 28 with the parts assembled as indicated, while when unit 15 is assembled to the opposite temple bar 13, the upper screw 31 thereof will connect with insert 30 of chassis plate 23. In this way, the same interunit connections will be made automatically when the casings are interchanged. Of course, the central connector for screw 25, and its corresponding screw at the opposite temple bow, may be single if it is accurately placed on the longitudinal axis of the chassis plate 23.

Figure 5:
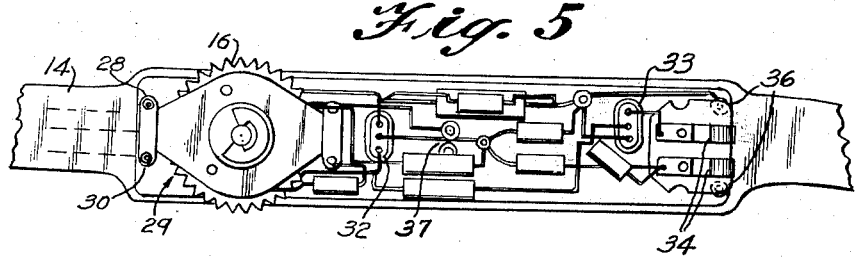
Fig 5 is an enlarged side elevation, with cover removed, of the electrical components carried by one temple bar.

Continuing with the description of Fig. 3, which shows the output amplifier section partly disassembled, the volume control 29 controls the signal level applied to a two-stage transistor output amplifier section, the transistors being designated 32 and 33, and the signal output is applied to clips 34 to receive the plug connector 35 connected to reproducer 17. The rear wall of casing 15 is apertured to pass this plug, and of course its upper wall is slotted to pass the knurled dial 16 of the volume control. These parts are also shown in Fig. 5, which in addition indicates the doubled insert connectors 36 at the right end of the chassis plate 23, and connectors 37 at the central location. Casing 15 may be dimensioned to snap over the chassis plate, or be held in any suitable fashion.

Figure 4:
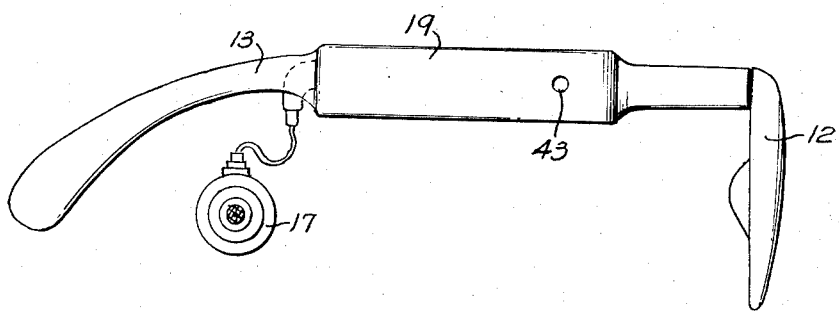
Fig. 4 is a side elevation of the invention taken from the side opposite that shown in Fig. 2.
Figure 6:
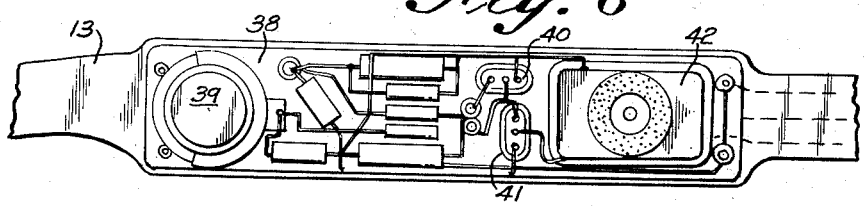
Fig. 6 is an enlarged side elevation, with cover removed, of the electrical components carried by the other temple bar.

The other amplifier casing 19 is shown assembled to the temple bow 13 in Fig. 4; the opposite temple bow is of course obscured in this view, but the reproducer 17 depending therefrom is indicated by that numeral. Fig. 6, drawn to a larger scale, shows the interior arrangement of this unit in casing 19, but with the casing cover removed. Here again, the parts are assembled upon a flat chassis plate 38 conforming dimensionally to plate 23. The single cell mercury battery 39 provides all of the power for the two units, and is held in a suitable spring clip for ready replacement. Two stages of amplification are provided in this unit, using transistors 40 and 41, the microphone being indicated by numeral 42 and communicating acoustically with the outside of the casing via an aperture 43 in casing 19 (see Fig. 4).

Figure 7:
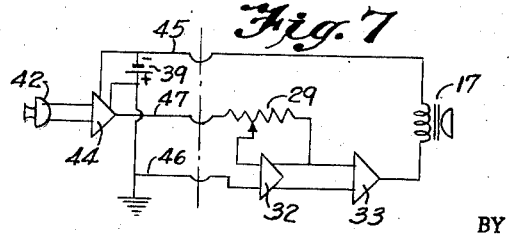
Fig. 7 is a schematic diagram of the electrical connections.

The electrical connections of the components do not form an essential part of this invention, and are amply described for example in the copending application of Prentiss and Valaskovic, Serial No. 552,744, filed December 13, 1955. For the purpose of understanding the interconnections between the two chassis plates via the embedded conductors in the spectacle front and temple bows, Fig. 7 indicates the components in block form. Thus, the input is indicated at microphone 42 whose electrical signal passes thence to the two stage amplifier 44 constituted by the two transistors 40 and 41 of Fig. 6. Battery supply for this amplifier is indicated at 39, and the opposite poles of the battery extend to the other unit as indicated by the looped conductor sections across the vertical chain line in Fig. 7. The two battery conductors so extended are designated 45 and 46, and circuit power for the operation of the output stages to the right of this chain line is thus made available over the upper and lower conductors of the set of three. The output signal from amplifier 44 appears between the central conductor 47 and the lower conductor 46, and is applied to the first stage of the output section (transistor amplifier stage 32 of Fig. 5) and amplified in the second stage (transistor amplifier stage 33 of Fig. 5) before being applied to the reproducer 17. The battery supply to these stages from conductors 45 and 46 in the section to the right of Fig. 7 is not indicated, but it is clear that such supply is available at this unit. The volume control 29 is of the feedback type, which is the reason for indicating it as connecting between 32 and 33 in Fig. 7.

The conductors represented as a whole by the reference numeral 20 in Fig. 1 may conveniently be embedded in the xylonite or other plastic compound of which the spectacle frame would ordinarily be constructed. One of these conductors can conveniently be extended across the temple hinge joints by making use of the usual metallic hinges themselves. As shown in Fig. 3, the remaining two conductors can readily be extended across these joints by terminating the conductors at the forward ends of the temple bows at small spring-pressed plungers such as 48, arranged to contact respective fixed conductor terminals 49 in the front bow 12 of the spectacles. Such connections permit ready removal of the entire temple bow when required for optical repairs, without the necessity for breaking soldered joints or the like, and without interfering with the normal folding up of the spectacles.

It will be seen from the above description that we have provided a combined hearing aid and spectacle frame construction in which the electronic comopnents including the battery and microphone are divided between two inconspicuous casings or containers of similar shape and size, and so arranged that the connections between casings are reduced to the minimum number to simplify the spectable frame construction. Moreover, perfect interchangeability has been achieved by the use of mechanical fasteners which serve as electrical connectors, and which are so disposed that proper interconnection is obtained simply by moving the casings to opposite temple bows.

While the invention has been disclosed herein in connection with a specific embodiment given by way of example and illustration, it is to be understood that various changes and modifications could be made without departing from the true spirit and scope of the invention as defined by the appended claims.

What is claimed is:

1. An eye glass hearing aid having electrical units including a microphone coupled to an amplifier energized from a power source with said amplifier coupled to a reproducer, said hearing aid comprising: a spectacle frame including a front frame member, a pair of solid side temple bow members extending from opposite ends of said front frame member and each having inside and outside portions, a plurality of conductors embedded in and extending from one of said temple bow members through said front frame member to the other of said temple bow members, and a plurality of first electrical and mechanical connector elements of a first mating type spaced apart on each of said temple bow members by individual selected distances and individually connected to respective end portions of each of said conductors; a pair of chassis members disposed individually on said outside portions with said amplifier and power source units mounted thereupon and distributed therebetween, said microphone disposed on one of said chassis members and said reproducer coupled to the other of said chassis members; and a plurality of second connector elements secured to each of said chassis members and individually mated with respective ones of said first connector elements to establish operative cooperation between said units by way of said conductors.

2. An eye glass hearing aid in accordance with claim 1, in which said matingly engaged connector elements comprise mounting screws contacting the ends of said conductors in said temple bow members, and matingly spaced threaded inserts secured to said chassis members.

3. An eye glass hearing aid in accordance with claim 2, including paired threaded inserts secured to each chassis member with each pair of inserts spaced apart from the next by said selected distances, said paired threaded inserts being spaced equally on opposite sides of the longitudinal axis of the respective chassis member.

References Cited in the file of this patent

UNITED STATES PATENTS

| | | |
|---|---|---|
| 2,168,781 | Petersen | Aug. 8, 1939 |
| 2,613,282 | Scaife | Oct. 7, 1952 |